United States Patent [19]

Okamura et al.

[11] Patent Number: 5,774,657
[45] Date of Patent: Jun. 30, 1998

[54] COMMUNICATION DATA PROCESSOR

[75] Inventors: Naoki Okamura, Nara; Noriyuki Takao; Hidetoshi Takano, both of Toyota, all of Japan

[73] Assignees: Toyota Jidosha Kabushiki Kaisha, Toyota; Sharp Kabushiki Kaisha, Osaka, both of Japan

[21] Appl. No.: 713,572

[22] Filed: Sep. 16, 1996

Related U.S. Application Data

[63] Continuation of Ser. No. 265,360, Jun. 24, 1994, abandoned.

[30] Foreign Application Priority Data

Jun. 30, 1993 [JP] Japan ..................................... 5-161044

[51] Int. Cl.$^6$ .............................. G06F 13/42; H04L 29/06
[52] U.S. Cl. ....................... 395/200.6; 395/680; 395/285; 370/469
[58] Field of Search .............................. 395/800, 200.01, 395/200.6, 680, 285; 370/94.1, 469

[56] References Cited

PUBLICATIONS

"The VMP Network Adapter Board (NAB): High Performance Network Communication for Multiprocessors" by H. Kanakia et al, SIGCOMM'88, Aug. 1988, Standford, CA –pp. 175–187.

"The High–Performance Network Architecture for a PA–RISC Workstation" by David Banks et al., IEEE Journal vol. 11, No. 2 Feb. 1993, New York US pp. 191–202.

*Primary Examiner*—Alyssa H. Bowler
*Assistant Examiner*—John Follansbee
*Attorney, Agent, or Firm*—Kenyon & Kenyon

[57] ABSTRACT

A communication data processor. Data received from a communication channel is stored in a data area. A list area corresponding to the data area in which the communication data has been stored is deleted from a vacant list management area and then added to a logical check list management area. A list area corresponding to a data area logically checked by a lower layer logical check section is deleted from the logical check list management area and then added to a higher layer protocol classification list management area. A list area corresponding to a data area classified by a higher layer protocol classification section is deleted from the higher layer protocol classification list management area and then added to the vacant list management area. When data relating to a protocol having an OSI model is to be processed, it is not required to perform the transfer of real data in a data storage.

10 Claims, 9 Drawing Sheets

COMMUNICATION DATA PROCESSOR

This application is a continuation of application Ser. No. 08/265,360, now abandoned, filed on Jun. 24, 1994.

BACKGROUND OF THE INVENTION a) Field of the Invention

The present invention relates to a communication data processor for storing communication data which are received from any other station through communication media such as communication channels or the like and transmitted by the processors' home station through the communication media and for processing these communication data in a hierarchy manner.

b) Description of the Prior Art

For example, if a data communication is to be carried out between control systems which are disposed in a factory at various locations, each of the control systems is required to have a communication control unit which should be connected to the other control units through the communication channels. FIG. 9 shows a communication control unit usable in such an application.

Referring to FIG. 9, there is shown a communication control unit 10 which is provided in an application equipment (not shown). The communication control unit is adapted to perform the data communication with a communication control unit disposed in any other application equipment through a communication channel 12.

The communication control unit 10 comprises a modulator/demodulator 14, a communication controller 16, a data storage 18, CPU 20, ROM 22 and a data I/O 24. CPU 20 is means for controlling the entire operation of the communication control unit 10 while ROM 22 has stored program and others required by the operation of the CPU 20. The data I/O 24 is a memory area in which data is transferred between the data I/O 24 and the processor of the associated application equipment, that is, the application processor. The data I/O 24 may be formed, for example, by 2 port RAM. The modulator/demodulator 14 modulates signals to be send to the communication channel 12 and also demodulates communication data from signals which are received by the communication control unit 10 through the communication channel 12. The communication controller 16 executes the transmission and reception processings. The transmission processing is one that transforms data from the application processor through the data I/O 24 into forms suitable for transmission while the reception processing is one that processes the reception data demodulated by the modulator/demodulator 14. The data storage 18 stores the reception data and others.

FIG. 10 shows the receiving function of the communication controller 16 according to the prior art. As shown, the receiving function of the communication controller 16 is provided by a reception section 26, a lower layer logical check section 28 and a higher layer protocol classification section. The communication controller 16 further comprises a data transfer section 32 associated with the reception section 26, another transfer section 34 associated with the logical check section 28 and still another transfer section 36 associated with the protocol classification section 30. To accomplish the receiving function, the data storage 18 comprises a plurality of data storage areas, that is, a reception data storage 100, a logical check data storage 102 and a higher layer protocol classification data storage 104. For simplicity, FIG. 10 does not show the modulator/demodulator 14 which should be drawn between the communication channel 12 and the communication controller 16.

The reception section 26 causes the reception data from the communication channel 12 through the modulator/demodulator 14 to be subjected to various procedures such as serial/parallel conversion and others before they are stored in the reception data storage 100. The data transfer section 32 transfers the reception data from the reception data storage 100 to the logical check data storage 102 wherein they are stored. The logical check data storage 102 is a work area for the lower layer logical check section 28 which performs a given procedure to the data stored in the logical check data storage 102. The data transfer section 34 transfers the data subjected to the procedure of the lower layer logical check section 28 and stored in the logical check data storage 102 to the higher layer protocol classification data storage 104 wherein they are then stored. The higher layer protocol classification section 30 preforms a given procedure to the data stored in the data storage 104 using it as a work area. The data transfer section 36 transfers the data subjected to the procedure of the higher layer protocol classification section 30 and stored in the data storage 104 to the data I/O 24 wherein they are then stored.

The reason why the data received by a communication control unit from the communication channel 12 through the modulator/demodulator 14 is processed sequentially by the reception section 26, lower layer logical check section 28 and higher layer protocol classification section 30 is that protocols relating to the communication between the communication control units 10 forms an OSI (Open Systems' Interconnection) model having a plurality of layers. In other words, each of the reception, lower layer logical check and higher layer protocol classification sections 26, 28 and 30 is provided as a processor section associated with the corresponding one of the layers defining the OSI model. In such a manner, the data transferred from a communication control unit 10 to another communication control unit 10 through the communication channel 12 can be subjected to a reception processing suitable to the protocol of the corresponding layer. Unlike Japanese Patent Laid-Open No. Hei 2-94733, for example, the processings for the respective layers are separated from one another such that the processing for a lower layer will not be affected by the processing for a higher layer. In other words, the independency of a layer processing will not be disturbed by any other layer processing.

On the other hand, the prior art system having such an arrangement is required to perform the sequential data transfer from the processing section for a layer to the processing section for the next layer. For example, the data subjected to the procedure of the lower layer logical check section 28 must be transferred to the data storage 104 which is a work area for the higher layer protocol classification section 30. In the prior art system, such a transfer is required by the respective layers. This increased the load on the system relating to the reception and disturbed the improvement of the communication performance. More particularly, the significant rate of power in the CPU 20 will be consumed to the data transfer. As a result, it is difficult that the sufficient power of the CPU 20 is applied to the data processing on the basis of a protocol for each layer (protocol processing for the respective layers). When the rate of power in the CPU 20 is less occupied by the protocol processing for each layer in the aforementioned manner, the throughput of the system cannot be improved very well.

SUMMARY OF THE INVENTION

It is therefore an object of the present invention to provide a communication data processing system which has an improved communication performance with an increased throughput by eliminating the transfer of real data which generally contain the huge information contents.

In a first aspect of the present invention, it provides a communication data processor comprising:

a) storage means having a plurality of data areas, said storage means being capable of storing a communication data at any one of the plurality of data areas;

b) multilayered processing means for performing a multilayered processing to the communication data on the plurality of data areas, said multilayered processing including a plurality of layer specified processings making a hierarchical structure, said multilayered processing means including a plurality of layer specified processing means each associated with the corresponding one of said layer specified processings, each of said layer specified processing means being operative to perform its own layer specified processing to the communication data while using at least one of the plurality of data areas in which the communication data to be processed has been stored; and c) a plurality of data area list delivery means each for delivering part of a data area list from one of the plurality of said layer specified processing means as a source to another as a destination, the part of the data area list containing information for managing at least one of the plurality of data areas at which the communication data haivng been subjected to the layer specified processing of the source and to be subjected to the layer specified processing of the destination has been stored.

In a second aspect of the present invention, it provides a communication data processing system comprising:

a) storage means having a plurality of data areas, said storage means being capable of storing a communication data at any one of the plurality of data areas;

b) first data transfer means for storing a communication data received or to be transmitted at any one of the plurality of data areas being now unused;

c) multilayered processing means for performing a multilayered processing to the communication data on the plurality of data areas, said multilayered processing including a plurality of layer specified processings making a hierarchical structure, said multilayered processing means including a plurality of layer specified processing means each associated with the corresponding one of said layer specified processings, each of said layer specified processing means being operative to perform its own layer specified processing to the communication data while using at least one of the plurality of data areas at which the communication data to be processed has been stored; and d) A communication data processor comprising:

storage means having a plurality of data areas, said storage means being capable of storing a communication data at any one of the plurality of data areas;

first data transfer means for storing a communication data received or to be transmitted at any one of the plurality of data areas being now unused;

multilayered processing means for performing a multilayered processing to the communication data on the plurality of data areas, said multilayered processing including a plurality of layer specified processings making a hierarchical structure, said multilayered processing means including a plurality of layer specified processing means each associated with the corresponding one of said plurality of layer specified processings, each of said plurality of layer specified processing means being operative to perform its own layer specified processing to the communication data while using at least one of the plurality of data areas at which the communication data to be processed has been stored; and new data area list delivery means for transferring data area management information from a vacant area list to a data area list when the first data transfer means stores the communication data on any one of said plurality of data areas, said vacant area list as a source storing the data area management information for managing at least one of the plurality of data areas being now unused by any one of said plurality of layer specified processing means, said data area list as a destination storing the data area management information for managing at least one of the plurality of data areas which has stored the communication data to be subjected to at least one of the plurality of the layer specified processings.

In a third aspect of the present invention, it provides a communication data processing system comprising:

a) storage means having a plurality of data areas, said storage means being capable of storing a communication data at any one of the plurality of data areas;

b) second data transfer means for reading the communication data having been subjected to a multilayered processing from at least one of the plurality of data areas at which said communication data is stored, said multilayered processing including a plurality of layer specified processings making an hierarchical structure;

c) multilayered processing means for performing the multilayered processing to the communication data on at least one of the plurality of the data areas, said multilayered processing means including a plurality of layer specified processing means each associated with the corresponding one of the plurality of layer specified processings, each of said layer specified processing means being operative to perform its own layer specified processing to the communication data while using at least one of the plurality of data areas at which the communication data to be processed has been stored; and d) a vacant area list delivery means for transferring data area management information from a data area list to a vacant area list when the second data transfer means reads a communication data from any one of said plurality of data areas, said vacant area list as a source storing the data area management information for managing at least one of the plurality of data areas being now unused by any one of said plurality of layer specified processing means, said data area list as a destination storing the data area management information for managing at least one of the plurality of data areas which has stored a communication data having been subjected to any one of the plurality of layer specified processings and to be subjected to at least one of the plurality of the layer specified processings.

According to the present invention, a communication data received or to be transmitted is subjected to the multilayered processing by the multilayered processing means defined by the plurality of layer specified processing means. A communication data to be processed is stored in the storage means at the respective one of the data areas. When a layer specified processing means completes its own layer specified processing, it is necessary to deliver the resulting communication data to other layer specified processing means. In the present invention, when delivering the communication data, the transfer of real communication data from a data area to another is not performed, unlike the prior art. What is actually transferred between the layer specified processing means according to the present invention is only the necessary information to manage a data area which has stored a communication data to be delivered.

Therefore, the present invention does not require the transfer and storage of communication data in the storage means when the processing is shifted from a layer specified processing means to another. The write/read of communication data relative to the storage means is at most required only when a new communication data which has not been subjected to the multilayered processing is to be stored in the storage means or when a communication data subjected to the multilayered processing is to be delivered to an application equipment or transmitted to a communicaiton media. Thus, the throughput of the communication data processing system can be improved to relieve the load on processing while maintaining the independency between the layer specified processings.

According to the present invention, the data area is managed by the data area list for any data area which is being now used to store the communication data and by the vacant area list for any data area which is not now used by any layer specified processing means, respectively. The management using the vacant area list permits data areas become unnecessary to be sequentially diverted for storing a new communication data which has not been subjected to the multilayered processing on the storage means.

Typically, the multilayered processing executed according to the present invention is one corresponding to a multilayered protocol which has been regulated relative to the transmission/reception of communication data through communication channels. In such a case, each of the layer specified processings is one corresponding to the respective one of layer specified protocols which form the multilayered protocol. Therefore, the present invention is suitable to a layer model such as so-called OSI model.

The data and vacant area lists (hereinafter both called merely "area lists") may have data area pointers, for example. Each of the data area pointers specifies a memory space on the storage means which is occupied by a data area to be managed by the corresponding area list. When the area list (strictly, a part thereof) having such a data area pointer is delivered to the other area list on shift of the processing from a layer specified processing means to another, on storage of a new communication data which has not been subjected to the multilayered processing on the storage means or on delivery or transmission of a communication data subjected to the multilayered processing to an application equipment or to a communication media, the aforementioned advantages can be realized.

For such a purpose that the memory space of the storage means occupied by the area list is reduced as small as possible and also to facilitate the management of data area, the area list may be constructed by a plurality of list areas arranged into an annulus-shaped chain and a list management area for managing the chain. The details thereof will be described below.

First of all, one list area is formed for each of the data areas. Each of the list areas is caused to store one of the aforementioned data area pointers. By referring to the data area pointer in a list area, therefore, it can be understood at which address the data area corresponding to such a list area has been formed in the memory space.

Each of the list areas is further caused to store an adjacent list pointer for specifying any adjacent list area. By referring to the adjacent list pointer stored in a list area, therefore, one of two list areas chained with this list area can be specified. Thus, the chain of list areas can be traced depending on the adjacent list pointers. This means that when a plurality of list areas are to be managed for every area list, all the informations relating to each of list areas to be managed are not necessarily required to be grasped individually for every area list. In other words, it is sufficient to grasp informations of which list area the list area chain contains and what scale the list area chain has.

To this end, the present invention provides a list management area for every area list. The list management area stores a list chain pointer and a list depth pointer. The list chain pointer is information for specifying at least one of the data areas to be managed by the area list concerned and therefore indicates which list area the list area chain contains. This list chain pointer can describe utilizing the contents of a self-list pointer stored in the corresponding list area for its own identification. The list depth pointer is information for indicating the number of data areas to be managed by the area list concerned and therefore shows what scale the list area chain has. By forming each of the area lists into such a structure, the present invention can realize an effective management.

The delivery of area list can be realized by deleting an area list from the source and adding it to the destination.

On deletion of the area list from the source, the content of an adjacent list pointer in one of two list areas chained directly with a list area corresponding to a data area relating to information to be delivered is first changed to one for specifying the self-list pointer of the other list area. Thus, the list area corresponding to the data area relating to the information to be delivered is deleted from the list area chain in the source. With this, the list depth pointer in the source is decremented by one. If the self-list pointer of the list area corresponding to the data area relating to the information to be delivered is managed as a list chain pointer, the content thereof is changed to one for specifying the other list area in the chain in the source.

On addition of the list area to the destination, the adjacent list pointer of a list area corresponding to a data area relating to information to be received is first changed to one for specifying a list area which is specified by the list chain pointer of the destination area list. The content of the list chain pointer is further changed to one for specifying a list area corresponding to the data area relating to the information to be received. Thus, the list area corresponding to the data area relating to the information to be received is added to the list area chain in the data area list or vacant area list in the destination. With this, the list depth pointer is incremented by one.

To permit the list area chain to be bidirectionally traced, it is preferred to provide two different sets of adjacent list pointer and list chain pointer. Prior to start of the multilayered processing, it is also preferred that information for managing all the data areas is added to the vacant area list.

DETAILED DESCRIPTION OF THE PREFERRED EMBODIMENT

Figure 9:
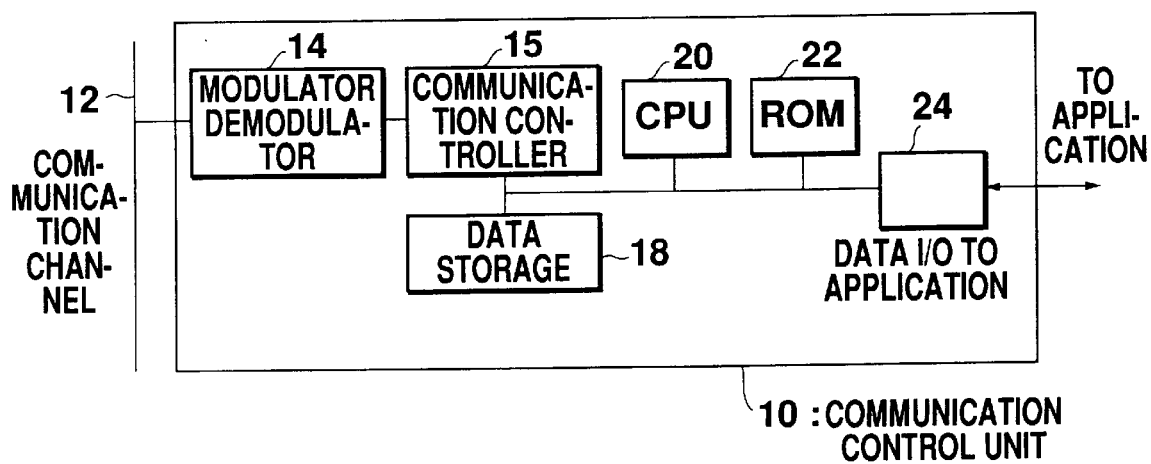
FIG. 9 is a block diagram showing the general layout of the communication control unit.
Figure 10:
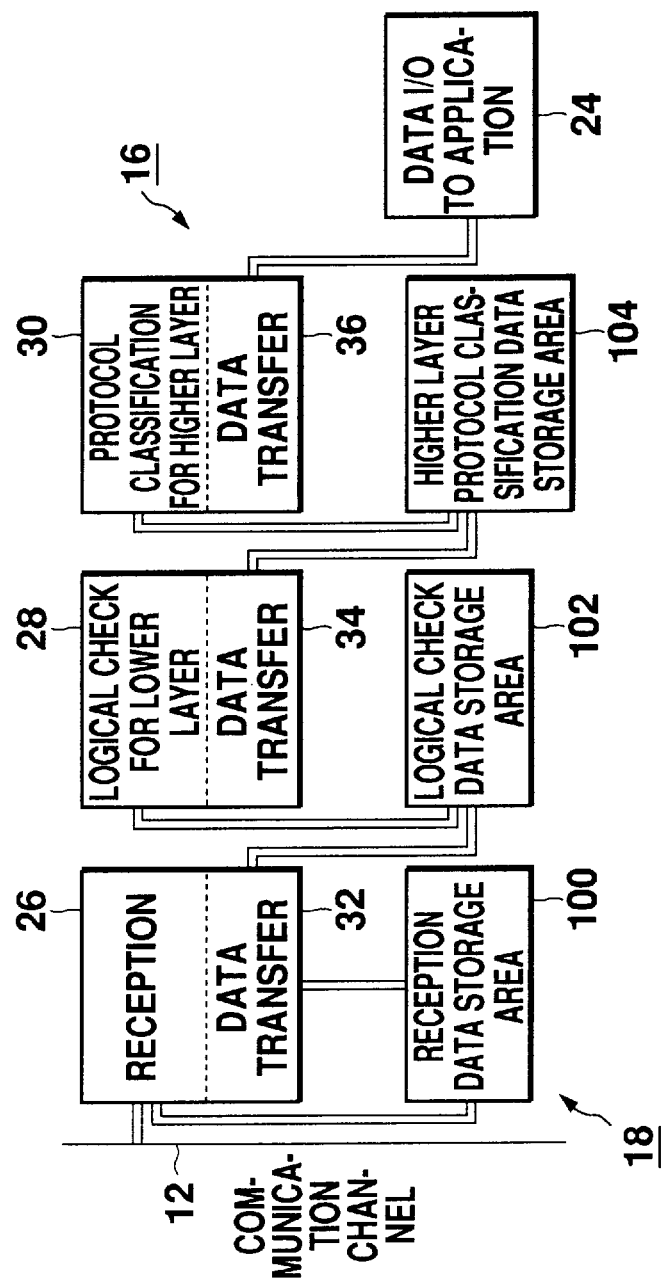
FIG. 10 is a block diagram showing the receiving function of a communication controller according to the prior art.

The present invention will now be described by way of example with reference to the drawings. Parts similar to those of the prior art shown in FIGS. 9 and 10 are denoted by similar reference numerals and will not further be described. The entire layout of the communication control unit which is used to embody the present invention is enough to be that of FIG. 9. Therefore, the entire layout of the communication control unit will not be described herein.

a) Receiving Function

Figure 1:
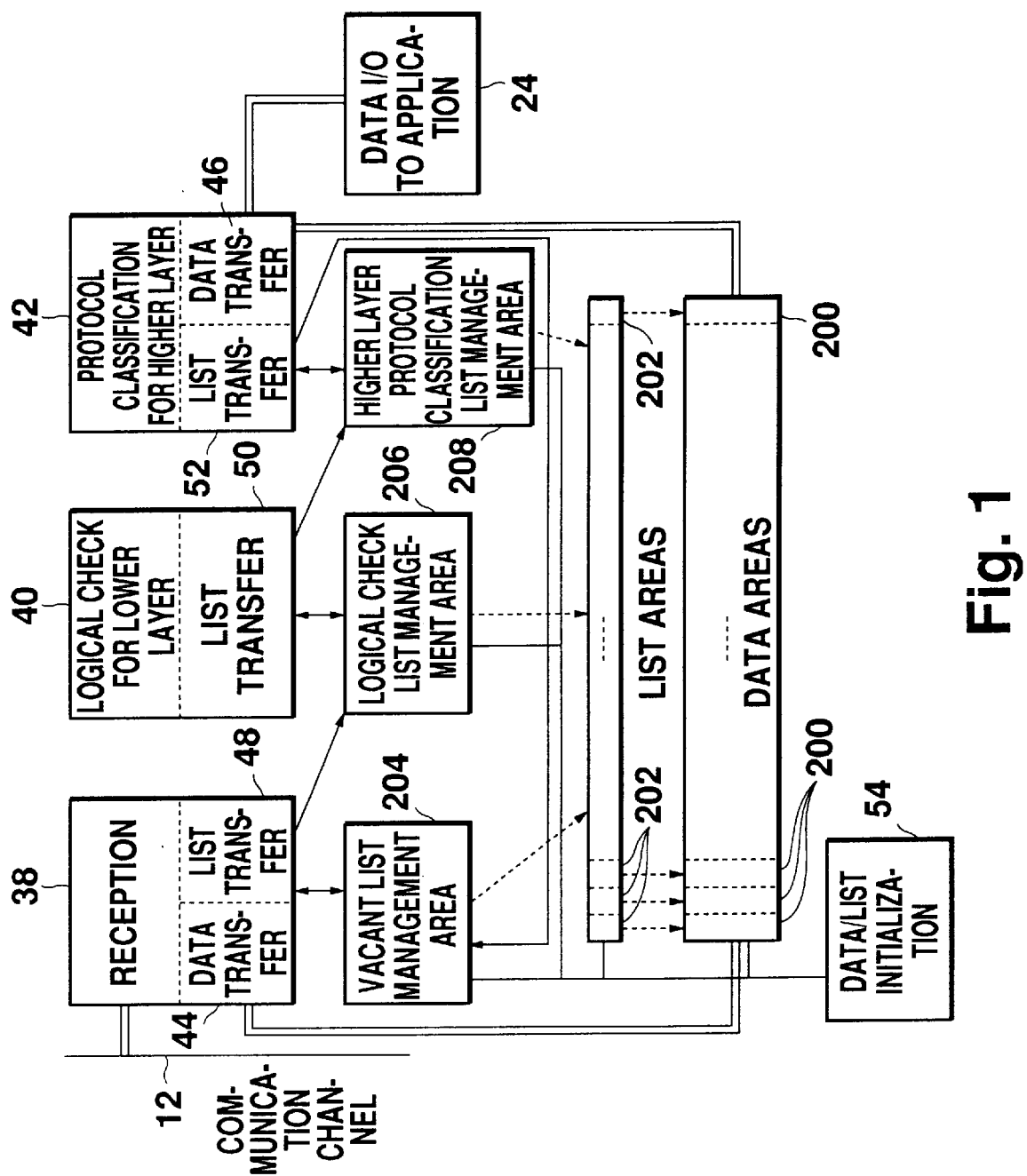
FIG. 1 is a block diagram of the receiving function of a communication controller in a communication control unit which is one embodiment of the present invention.

FIG. 1 illustrates the receiving function in a communication control unit relating to one embodiment of the present invention, particularly, in its communication controller 16. As in FIG. 10, FIG. 1 does not show the modulator/demodulator 14. As shown, the receiving function of the communication controller 16 in this embodiment is provided by a reception section 38, a lower layer logical check section 40 and a higher layer protocol classification section 42. The communication controller 16 also comprises data transfer section 44 and list transfer section 48 associated with the reception section 44, a list transfer section 50 associated with the lower layer logical check section 40 and list transfer section 52 and data transfer section 46 associated with the higher layer protocol classification section 42. The reception function of the communication controller 16 further comprises a data and list initializing section 54.

This embodiment is most characterized by a list (which will be described later), rather than real data, that on reception of data, is transferred from the reception section 38 to the lower layer logical check section 40 or from the lower layer logical check section 40 to the higher layer protocol classification section 42. The list transfer sections 48, 50 and 52 have a function of executing the list transfer.

In place of the real data transfer, the list transfer is used in the present invention so as to enable to execute each layer processing by using a transferred list to manage the memory area of the real data. In this embodiment, such a management can be realized by assigning parts of the memory area on a data storage 18 into a plurality of data areas 200, a plurality of list areas 202, a vacant list management area 204, a logical check list management area 206 and a higher layer protocol classification list management area 208.

The real data from the communication channel 12 is first subjected to various processings such as serial/parallel conversion and others at the reception section 38. The real data subjected to the processings at the reception section 38 are written in the data areas 200 by the data transfer section 44. More particularly, the respective data areas 200 store the real data. The size and number of the data areas 200 may be selected depending on the content, amount and frequency of communication. For example, one data area 200 may have a size of 256 bytes and the number of such data areas may be equal to 100.

Figure 2:
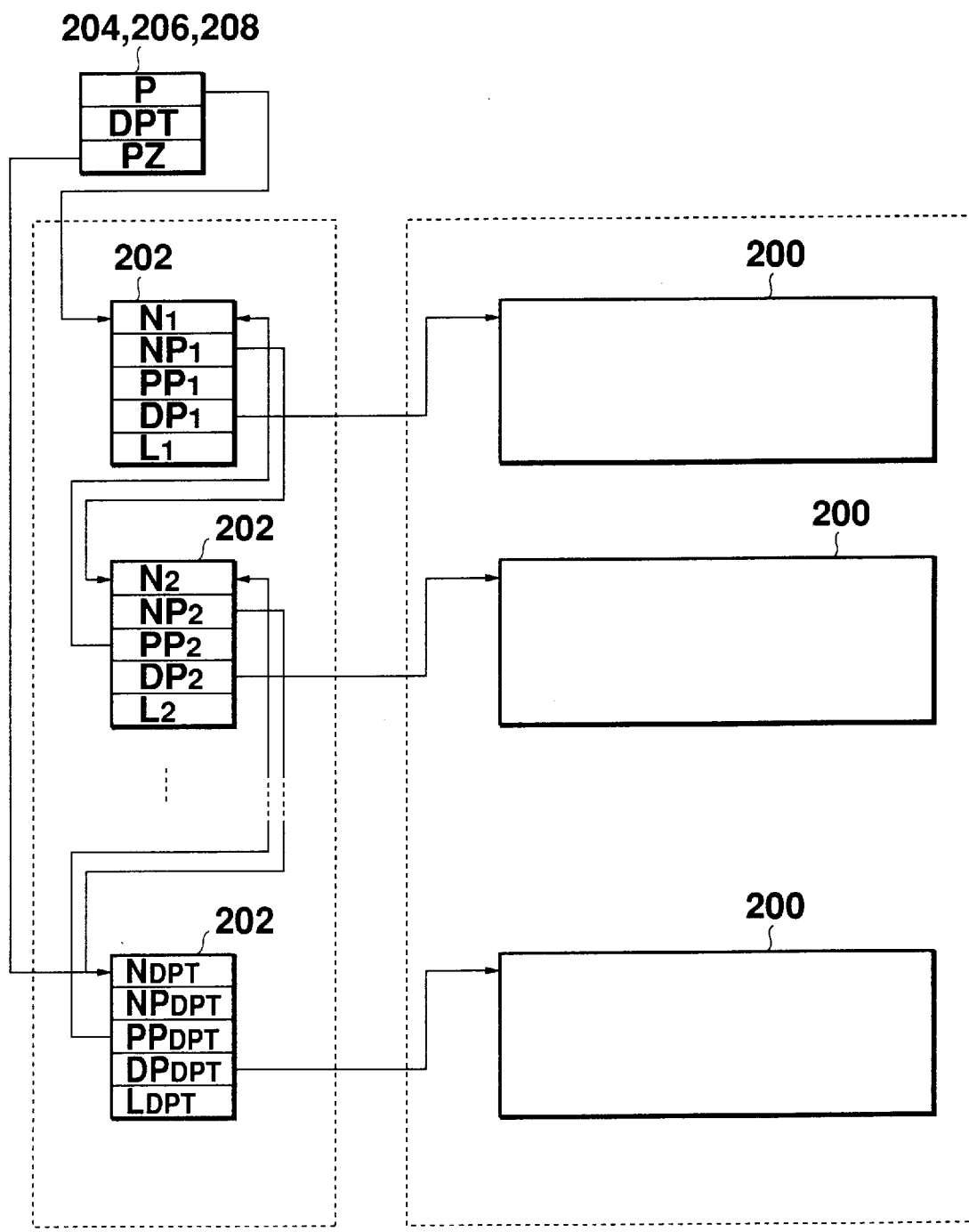
FIG. 2 is a view showing the relationship between the list management area, list areas and data areas in the embodiment of FIG. 1.

Each of the list areas 202 is one for storing various pointers relating to the corresponding data area 200. As shown in FIG. 1, one list area 202 is set against one data area 200. As shown in FIG. 2, the i-th list area 202 is constructed by a list number Ni, a next list pointer NPi, a preceding list pointer PPi, a data area head pointer DPi and a data area length Li. Their contents will be described later.

The vacant list management area 204 manages list areas 202 corresponding to vacant data areas 200, that is, list areas 202 corresponding to data areas 200 in which real data to be processed are not now written. The logical check list management area 206 manages list areas 202 corresponding to data areas 200 in which real data to be processed by the lower layer logical check section 40 have been written. The higher layer protocol classification list management area 208 manages list areas 202 corresponding to data areas 200 in which real data to be processed by the higher layer protocol classification section 42 have been written. As shown in FIG. 2, each of these list management areas 204, 206 and 208 is respectively formed by a list head pointer P, a list depth DPT and a list end pointer PZ.

Lists managed by these list management areas are sequentially transferred to a later list management area. Data subjected to the processing of the higher layer protocol classification section 42 is transferred to the data I/O area 24 by the data transfer section 46.

b) Relationship Between List Management Areas, List Areas and Data Areas

FIG. 2 shows the relationship between each of the list management areas 204, 206 and 208 and list and data areas 202, 200, which is drawn at a time. As shown, the list areas 202 are managed in the form of a daisy-chain.

For example, if 100 data areas 200 are set, the number of list areas 202 located in one-to-one correspondence to the data areas is equal to 100. When the real data received or to be processed is to be stored, only a part of the data areas 200 is generally used. The vacant list management area 204 is one for managing list areas 202 corresponding to unused data areas 200. Therefore, the vacant list management area 204 is different, in use and thus only by a subject to be managed, from the other list management areas 206 and 208. For such a reason, the relationship between the vacant list management area 204 and the list and data areas 202, 204 which are managed by the vacant list management area 204 will be described below. Such a relationship is true of the other list management areas 206 and 208.

Each of the data areas 200 occupies a part of memory space on the data storage 18. The head pointer of that data area 200 has been stored in the corresponding list area 202 as a data area head pointer $DP_i$ while the length thereof has been stored in the corresponding list area 202 as a length $L_i$. When it is desired to know addresses occupied by a data area 200, one may refer to the corresponding list area 202.

For example, if 100 data areas 200 are set, the number of list areas 202 located in one-to-one correspondence to these data areas is equal to 100. Each of these list areas 202 has a serial number or list number $N_i$ to identify it. Since one of the list areas 202 corresponds to any one of the data areas 200, the list number $N_i$ can be used to specify a desired data area 200.

The list depth DPT of the vacant list management area 204 indicates the number of data areas 200 which are not used by any processing sections (38–42). Thus, the vacant list management area 204 will manage the list areas 202 corresponding to these data areas 200, which are equal to DPT in number.

The list head pointer P of the vacant list management area 204 indicates the head address of one of the list areas 202 to be managed, that is, a list area 202 having its list number $N_1$. The list area 202 of list number $N_1$ has stored the head pointer of the next list area 202 i.e. list area having its list number $N_2$ as a next list pointer $NP_1$. Similarly, the list area 202 of list number $N_2$ having a head address equal to the next list pointer $NP_1$ has stored the head address of a list area 202 having its list number $N_3$ as a next pointer $NP_2$. In such a manner, the list areas 202 equal to DPT in number will be chained together.

The list end pointer PZ of the vacant list management area 204 indicates the head address of a list area 202 having it list number $N_{DPT}$ among the DPT list areas 202 to be managed. The list area 202 of list number $N_{DPT}$ has stored the head address of a preceding list area 202 i.e. list area having its list number $N_{DPT-1}$ as a preceding list pointer $PP_{DPT}$. Similarly, a list area 202 of list number $N_{DPT-1}$ having the preceding list pointer $PP_{DPT}$ as a head address has stored the head address of a list area having its list number $N_{DPT-2}$ as a preceding list pointer $PP_{DPT-1}$.

In this embodiment, therefore, the chain of DPT list areas 202 can be traced either by the next list pointers $NP_i$ in the ascending order of i or by the preceding list pointers $PP_i$ in the descending order of i.

If there is no list area 202 to be managed, a specific value such as zero or the like is set at the pointers on the vacant list management area 204.

c) Initialization

The contents of these list areas 202 and list management areas 204, 206 and 208 are initialized by the data and list initializing section 54 shown in FIG. 1.

On initialization, the data and list initializing section 54 first causes all the list areas 202 to correspond to all the data area 200 in one-to-one correspondence. In other words, a list number $N_i$=i is applied to every list area 202 while the head address of a data area 200 is stored in the corresponding list area 202 as a data area head pointer $DP_i$.

The data and list initializing section 54 further registers all the list areas 202 under management of the vacant list management area 204. This is because none of the data areas 200 is used at the initial state in which the communication is not started. More particularly, the data and list initializing section 54 stores the head address of the i+1-th list area 202 at the next list pointer $NP_i$ of the i-th list area 202 and also the head address of the i−1-th list area 202 at the preceding list pointer $PP_i$ of the i-th list area 202. Thus, all the list areas 202 are connected with one another in the ascending and descending orders of list number $N_i$. Further, the head address of the first list area 202 is stored in the vacant list management area 204 as a list head pointer P while the head address of the last list area 202 is stored in the vacant list management area 204 as a list end pointer PZ. The vacant list management area 204 stores the total number of data areas 200 (the total number of list areas 202) as a list depth DPT. Thus, the vacant list management area 204 can manage all the list areas 202.

The operation of each processing section will be described.

d) Operation on Reception Section

Figure 3:
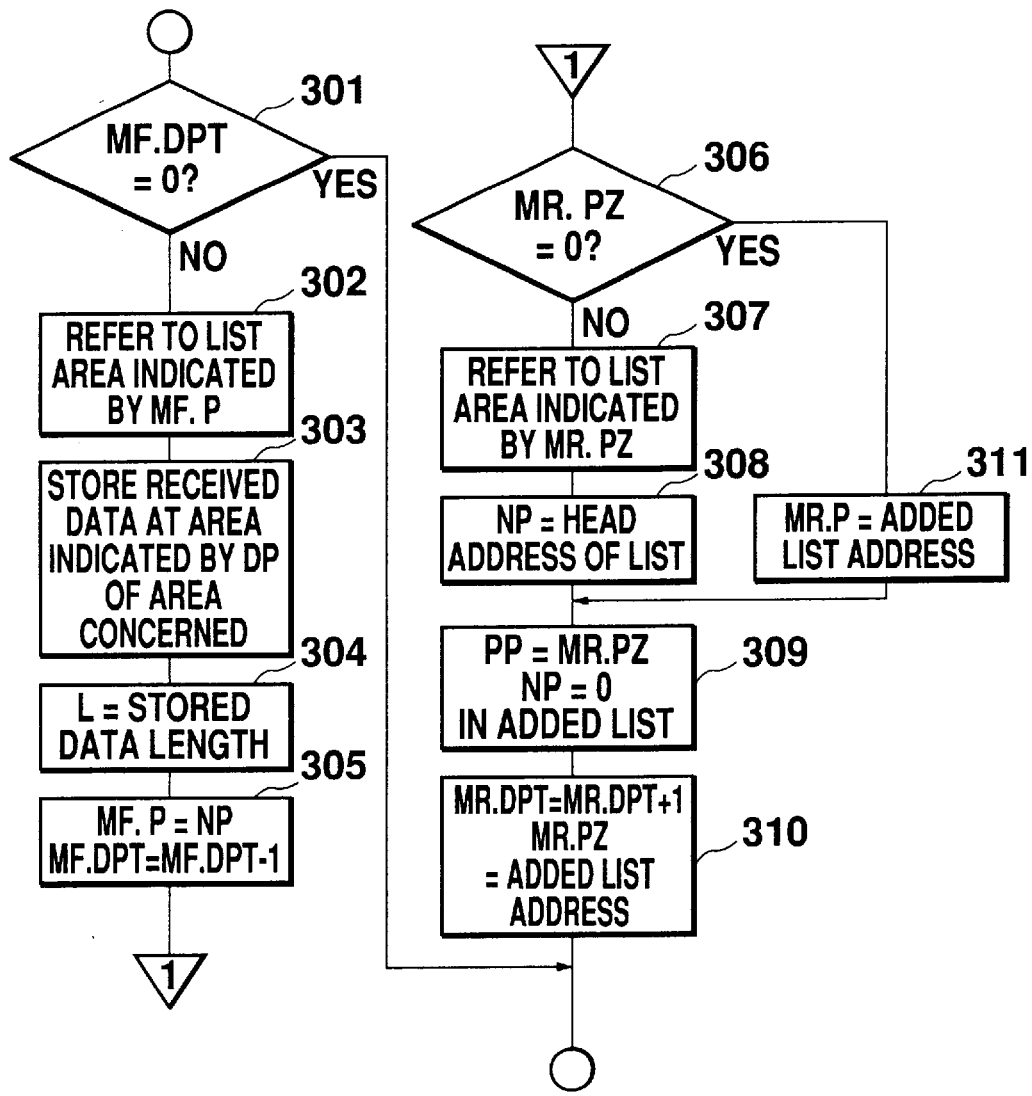
FIG. 3 is a flowchart showing the operational flow of the reception section and its data transfer and list transfer sections in the embodiment of FIG. 1.

The reception section 38 first executes a reception processing shown in FIG. 3 depending on interruption. FIG. 3 shows the operational flow of th reception section 38 and its data and list transfer sections 44, 48.

The reception section 38 first refers to the vacant list management area 204 and confirms whether or not the list depth DPT (NF.DPT in FIG. 3) stored in the vacant list management area 204 is zero (301). If MF.DPT is zero, the procedure of FIG. 3 is terminated to report a failure since it means that there is no empty data area 200. If it is confirmed that MF.DPT is not zero, the reception section 38 uses the list head pointer P (MF.P in FIG. 3) of the vacant list management area 204 to refer to the first one of list areas 202 which are under the management of the vacant list management area 204 (302). The reception section 38 thus obtains the head pointer $DP_i$ of the corresponding data area. The data transfer section 44 of the reception section 38 performs any given processing such as serial/parallel conversion or the like to data received from the communication channel 12 through the modulator/demodulator 14. The processed data is then stored in the data area 200 corresponding to the first list area 202 (303).

On termination of the storage of all the data, the list transfer section 48 of the reception section 38 causes the stored data length to be stored in the corresponding list area 202 as a length $L_i$ (304). The reception section 38 causes the head address of a list area 202 corresponding to the next data area 200 to the data area 200 used in the data storage to be stored in the vacant list management area 204 as MF.P and also causes MF.DPT to be decremented by one (305). In other words, the list area 202 used in the storage of real data is deleted from the list areas 202 managed by the vacant list management area 204. The deletion of list will be described with the addition of list.

The list transfer section 48 then confirms the value of the list end pointer PZ (MR.PZ in FIG. 3) on the logical check list management area 206 (306). If a value other than zero is set at MR.PZ, the list transfer section 48 stores the head address of a list area deleted from the vacant list management area 204 in the step 305 at a list area 202 having MR.PZ as its head address (307), as a next list pointer $NP_i$ (308). The list transfer section 48 further stores MR.PZ (i.e., the head address of the immediately preceding list area 202) at the preceding list pointer $PP_i$ of the deleted list area 202 such that the next list pointer $NP_i$ of the list area concerned is set zero (309). In other words, a list area 202 corresponding to a data area 200 in which the received data is stored by the data transfer section 44 is connected to the end of a series of list areas 202 which are managed by the logical check list management area 206. The list transfer section 48 adds one to the list depth DPT (MR.DPT in FIG. 3) on the logical check list management area 206 and sets the head address of the newly connected list area 202 as MR.PZ (310). Such a processing will be called an addition of list since it adds a new list area 202 under the management of the logical check list management area 206. If it is judged in the step 306 that MR.PZ is equal to zero (MR.PZ=0), the list transfer section 48 considers that no list area 202 has been registered in the logical check list management area 206 and executes step 309 and further steps after the head address of the added list area 202 has been stored in the list head pointer P (MR.P in FIG. 3) of the logical check list management area 206(311).

e) Operation on Lower Layer Logical Check

Figure 4:
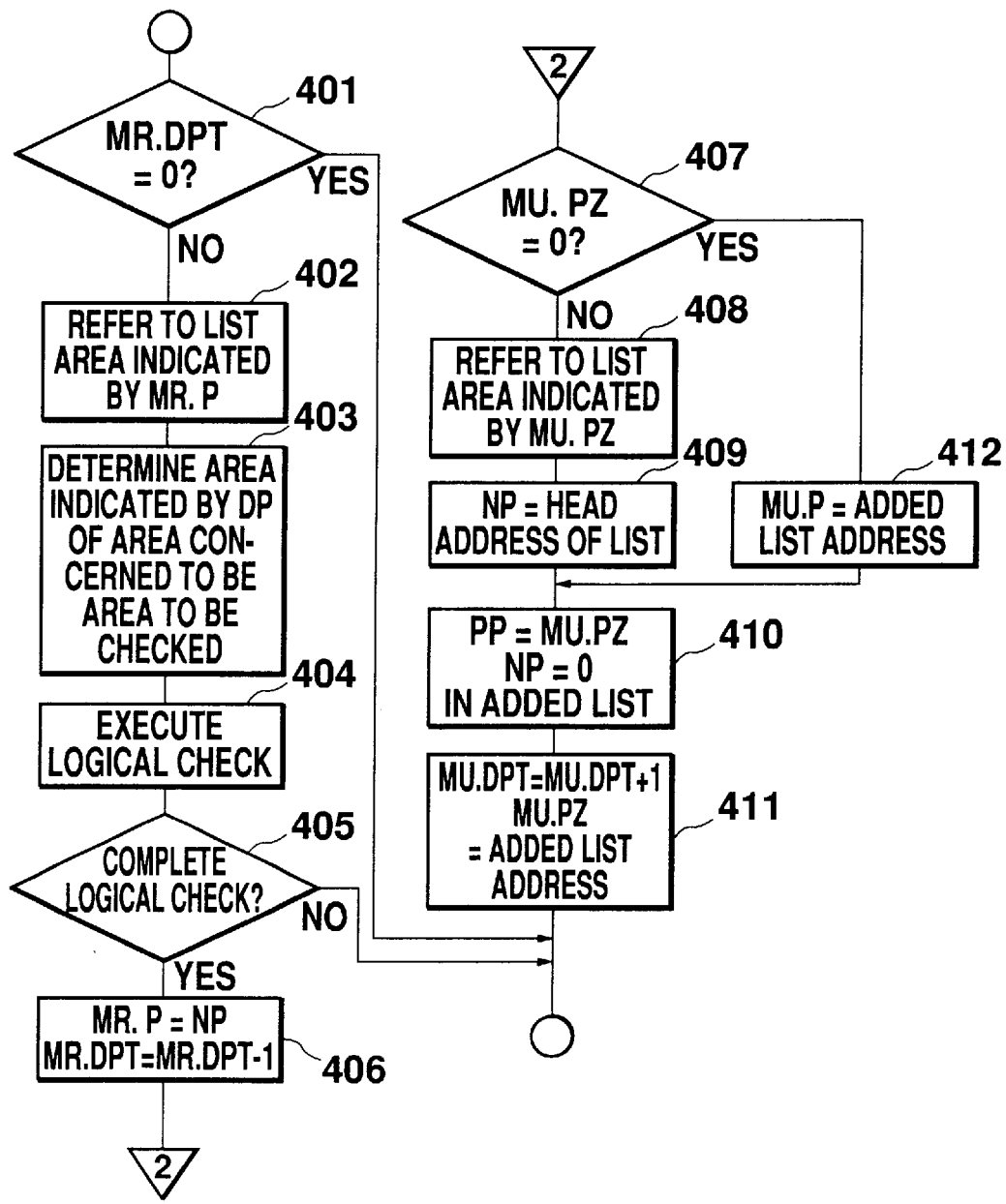
FIG. 4 is a flowchart showing the operational flow of the lower layer logical check section and its list transfer section in the embodiment of FIG. 1.

FIG. 4 shows the operational flow of the lower layer logical check section 40 and its list transfer section 50.

The lower layer logical check section 40 first refers to the logical check list management area 206 to confirm whether or not MR.DPT is zero (410). If MR.DPT is zero, the lower layer logical check section 40 considers that there is no data to be logically checked and hence the operation of FIG. 4 is terminated. If it is confirmed that MR.DPT is not zero, the lower layer logical check section 40 uses MR.P to refer to the first one of list areas 202 being managed by the logical check list management area 206 (402). Thus, the head pointer $DP_i$ of the corresponding data area 200 can be obtained (403). The lower layer logical check section 40 executes a given logical check to data on the data area 200 starting from the address pointed by such a head pointer (404). For example, the matching of data relating to the logical ring is confirmed. The logical ring is a ring-like chain formed as by the token passing of communication control units now joined to the communication in a network.

The list transfer section 50 deletes a list area 202 from list areas 202 being managed by the logical check list management area 206 after that list area has been subjected to the logical check (405). More particularly, a next list pointer $NP_i$ is read out from a list area 202 corresponding to the logically checked data area 200 and then stored in MR.P as well as MR.DPT is decremented by one (406).

The list transfer section 50 then confirms the value of the list end pointer PZ (MU.PZ in FIG. 4) of the higher layer protocol classification list management area 208 (407). If any value other than zero is set at MU.PZ, the list transfer section 50 stores the head address of a list area 202 deleted from the logical check list management area 206 in the step 406 at the list area 202 having the head address equal to of MU.PZ (408) as a next list pointer $NP_i$ (409). The list transfer section 50 further stores MU.PZ (i.e., the head address of the immediately preceding list area 202) at the preceding list pointer $PP_i$ of the deleted list area 202 and set zero as the nest list pointer $NP_i$ of the list area 202 (410). More particularly, a list area 202 corresponding to the logically checked data area 200 is coupled to the end of a series of list areas 202 which are managed by the higher layer protocol classification list management area 208. The list transfer section 50 adds one to the list depth DPT (MU.DPT in FIG. 4) on the higher layer protocol classification list management area 208 and further sets the head address of the newly coupled list area 202 as MU.PZ (411). This means that a list is added to the higher layer protocol classification list management area 208. If it is judged in the step 407 that MU.PZ is equal zero (MU.PZ=0), the list transfer section 50 considers that no list area 202 has been registered in the higher layer protocol classification list management area 208 and then stores the head address of the added list area 202 at the list head pointer P (MU.P in FIG. 4) of the higher layer protocol classification list management area 208 (412) and skips to the step 410 and further steps.

f) Operation on Higher Layer Protocol Classification

Figure 5:
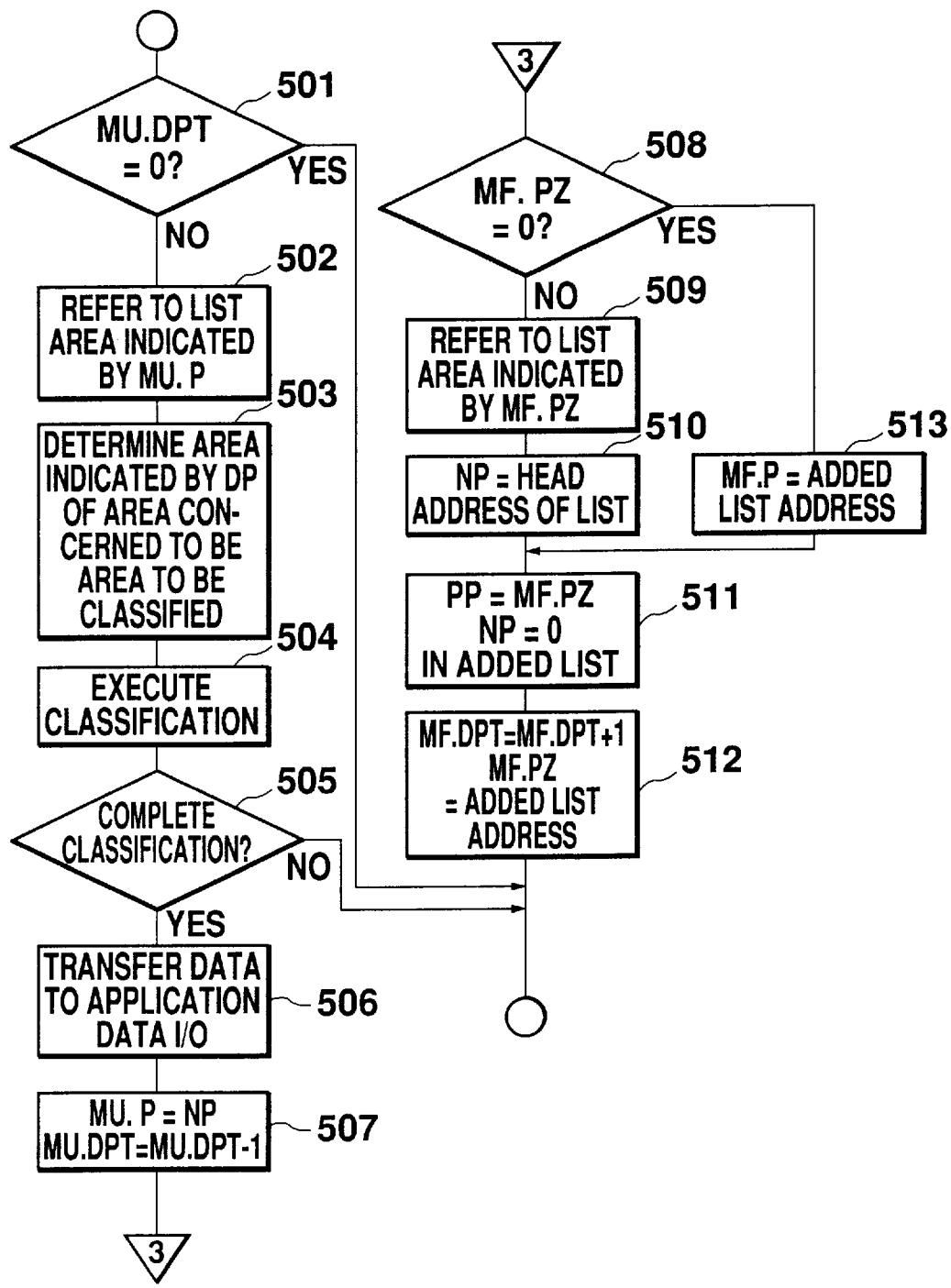
FIG. 5 is a flowchart showing the operational flow of the higher layer protocol classification section and its list transfer and data transfer sections in the embodiment of FIG. 1.

FIG. 5 shows the operational flow of the higher layer protocol classification section 42 and its list and data transfer sections 52, 46.

The higher layer protocol classification section 42 first refers to the higher layer protocol classification list management area 208 to confirm whether or not MU.DPT is zero (501). If MU.DPT is zero, the higher layer protocol classification section 42 considers that there is no data to be classified and terminates the operation of FIG. 5. If it is judged that MU.DPT is not zero, the higher layer protocol classification section 42 uses MU.P to refer to the first one of list areas 202 being managed by the higher layer protocol classification list management area 208 (502) and to obtain the head pointer $DP_i$ of the corresponding data area 200 (503). The higher layer protocol classification section 42 executes a given classification to data on the data area 200 starting from the address indicated by such a head pointer (504).

After the classification step (505), the data transfer section 46 transfers the data from the classified data area 200 to the data I/O area 24 to the application processor (506). The list transfer section 52 thereafter deletes a list area 202 from the higher layer protocol classification list management area 208. In other words, a next list pointer $NP_i$ is read out from a list area 202 corresponding to a data area 200 which became unnecessary as the result of the transfer of data to the data I/O area 24 and then stored in MU.P as well as MU.DPT is decremented by one (507).

The list transfer section 52 then confirms the value of MF.PZ (508). If MF.PZ is set at any value other than zero, the list transfer section 52 refers the list area 202 having its head address equal to MF.PZ (509) and stores the head address of the list area 202 deleted from the higher layer protocol classification list management area 208 in the step 507 at the list area 202 having its head address equal to MF.PZ as a next list pointer $NP_i$ (510). The list transfer section 52 further stores MF.PZ (i.e., the head address of the immediately preceding list area 202) at the preceding list pointer $PP_i$ of the deleted list area 202 and sets the next list pointer $NP_i$ of the list area 202 to zero (511). In other words, the list area 202 corresponding to the data area 200 become unnecessary is connected to the end of a series of list areas 202 which are managed by the vacant list management area 204. The list transfer section 52 adds one to MF.DPT and further sets the head address of the newly added list area 202 to MF.PZ (512). This is the addition of list to the vacant list management area 204. If it is judged in the step 508 that MF.PZ is equal to zero (MF.PZ=0), the list transfer section 52 considers that no list area 202 has been registered in the vacant list management area 204 and then stores the head address of the added list area 202 (513) at MF.P and skips to the step 511 and further steps.

g) Deletion and Addition of List

Figure 6:
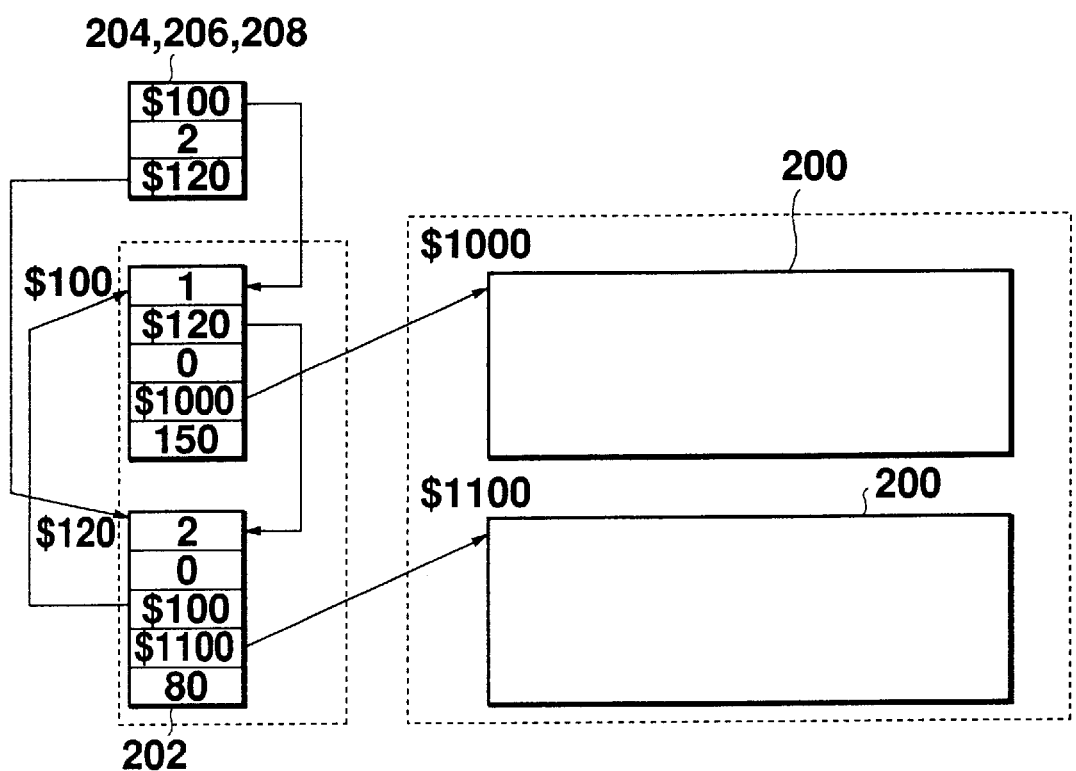
FIG. 6 is a conceptual view showing a list management in the embodiment of FIG. 1.
Figure 7:
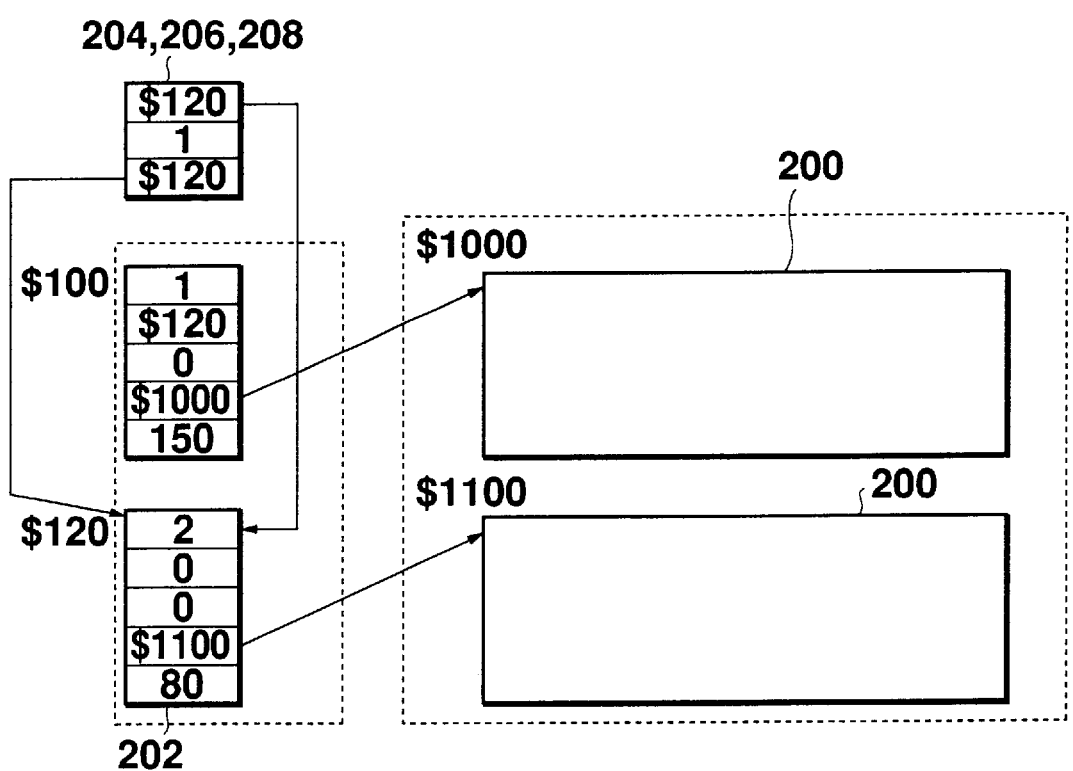
FIG. 7 is a conceptual view showing a list deletion process in the embodiment of FIG. 1.
Figure 8:
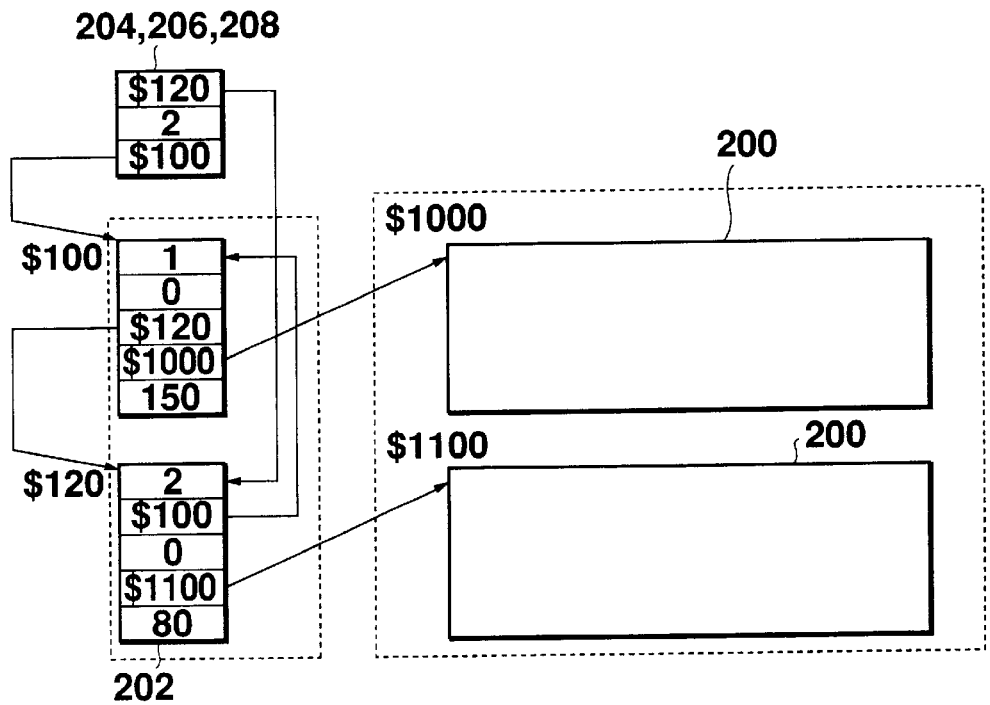
FIG. 8 is a conceptual view showing a list addition process in the embodiment of FIG. 1.

FIGS. 6–8 conceptually shows a procedure of list deletion and addition. For simplicity, it is assumed herein that there are two data areas 200 and two list areas 202.

In FIG. 6, an address $100 is stored at the list head pointer P of the list management area 204, 206 or 208; 2 at the list depth DP; and an address $120 at the list end pointer PZ. As a list number $N_i$, 1 is applied to a list area 202 specified by the list head pointer P=$100. An address $1000 is stored at the data area head pointer $DP_i$ while 150 is stored at the length $L_i$. Therefore, the data area 200 corresponding to that list area 202 is an area having the length 150 starting from the address $1000. An address $120 is stored at the next list pointer $NP_i$ of this list area 202 while as a list number $N_i$=2, 2 is applied to a list area 202 starting from the address $120. An address $1100 is stored in the list area 202 having its list number $N_i$=2. 80 is stored at the length $L_i$. Therefore, a data area 200 corresponding to that list area 202 is an area having its length equal to 80 starting from the address $1100. An address $100 is stored at the preceding list pointer $PP_i$ of the list area 202 having its list number $N_i$=2 while an address $120 is stored at the list end pointer PZ of the list management area 204, 206 or 208.

FIG. 7 shows a state wherein the list area 202 having its list number $N_i$=1 is deleted in such a state as shown in FIG. 6. More particularly, by executing the step 305, 406 or 507 which relates to the deletion of list, the list head pointer P of the list management area 204, 206 or 208 is changed to the head address $120 of the list area 202 having its list number $N_i$=2 and the preceding list pointer $PP_i$ of the list area 202 having its list number $N_i$=2 is changed to zero. In such a state, the list area 202 having its list number $N_i$=1 is deleted from a chain from the list management area 204, 206 or 208 through the list area 202 back to the list management area 204, 206 or 208.

FIG. 8 shows a state wherein the list area 202 having its list number $N_i$=1 is added to such a state as shown in FIG.

7. More particularly, by executing the steps 308–311, 408–412 or 510–513 which relate to the addition of list, the list end pointer PZ of the list management area 204, 206 or 208 is changed to the head address $100 of the list area 202 having its list number $N_i=1$; the next list pointer $NP_i$ and the preceding list pointer $PP_i$ of the list area 202 having its list number $N_i=1$ are changed to zero and the head address $120 of the list area 202 having its list number $N_i=2$, respectively; and the next list pointer $NP_i$ of the list area 202 having its list number $N_i=2$ is changed to the head address $100 of the list area 202 having its list number $N_i=1$. In such a state, the list area 202 having its list number $N_i=1$ is added to a chain from the list management area 204, 206 or 208 through the list area 202 back to the list management area 204, 206 or 208.

h) Advantages of the Embodiment

Since no real data is required to be transferred to the data storage 18 in the present embodiment, the throughput of the system can be prevented from being reduced by the transfer of data. Since the length of the delivered list is at most within several tens bytes, the transfer of the list will not very apply a load onto the system. Therefore, the reduction of the throughput in the system can be prevented with improvement of the communication properties.

Since the list areas 202 are used to form a chain with the list management area 204, 206 or 208, the list management and other states can be investigated by following such a chain.

i) Others

Although the present invention has been described only as to the reception, as apparent to those who skilled, it may be similarly applied to the transmission. Furthermore, the present invention is not limited by the number of layers in the OSI model.

We claim:

1. A communication data processor comprising:

storage means having a plurality of data areas, said storage means being capable of storing a communication data in any one of the plurality of data areas;

multilayered processing means for performing a multilayered processing of the communication data stored in the plurality of data areas, said multilayered processing including a plurality of layer specified processing forming a hierarchical structure, said multilayered processing means including a plurality of layer specified processing means, each associated with a corresponding one of said plurality of layer specified processing, each of said plurality of layer specified processing means being operative to perform its own layer specified processing of the communication data while using at least one of the plurality of data areas in which the communication data to be processed has been stored; and a plurality of data area list delivery means, each for delivering part of a data area list containing data area management information from one of the plurality of said layer specified processing means, said one being a source, to another of the plurality of layer specified processing means, said other being a destination, wherein the data area management information comprises data area pointers specifying a memory space of said storage means occupied by at least one of the plurality of data areas to be managed by said data area list and storing communication data subjected to the layer specified processing by the source and to be subjected to the layer specified processing by the destination, wherein the data area list includes:

a plurality of list areas, on the storage means corresponding to any one of the plurality of data areas, for storing: (1) a self-list pointer for specifying itself, (2) at least one of a plurality of adjacent list pointers, each for specifying another one of the plurality of list areas to be managed, and (3) said data area pointer, wherein said plurality of list areas are sequentially chained into an annulus through the at least one of the plurality of adjacent list pointers of the plurality of list areas; and a plurality of list management areas, on the storage means, for storing a list chain pointer for specifying at least one of the plurality of data areas to be managed by said data area list and a list depth pointer for indicating the number of at least one of the plurality of data areas to be managed by said data area list.

2. The communication data processor according to claim 1, wherein on delivery of data area management information and in connection with the source, said list delivery means is operative to delete at least one of the plurality of list areas, which one corresponds to at least one of the plurality of a data areas relating to the data area management information to be delivered, from the chain of list areas in the sources, by:

(i) replacing a contents of at least one adjacent list pointer in one of two list areas chained directly with each of the list areas to be delivered, which each correspond to data areas that relate to the data area management information to be delivered, with a value for specifying the self-list pointer of the other one of the two list areas;

(ii) decrementing the list depth pointer by one; and (iii) replacing a contents of a list chain pointer with a value for specifying the other one of the two list areas, when the self-list pointer of the list area, which corresponds to the data area that relates to the data area management information to be delivered, is said list chain pointer.

3. The communication data processor according to claim 2, wherein two adjacent pointers and two list chain pointers are provided for following the chain of list areas bidirectionally.

4. The communication data processor according to claim 1, wherein upon delivery of the data area management information and in connection with the destination, the list delivery means is operative to add at least one of the list areas, which corresponds to at least one of the data areas relating to the data area management information to be received, to the chain of list areas in the destination, by:

(i) replacing the at least one adjacent list pointer in at least one of the list areas, which corresponds to at least one of the data areas that relate to the data area management information to be received, with a value for specifying at least one of the list areas specified by its list chain pointer;

(ii) incrementing the list depth pointer by one; and (iii) replacing a contents of the list chain pointer with a value for specifying at least one of the list areas corresponding to at least one of the data areas that relate to the data area management information to be received.

5. A communication data processor comprising:

storage means having a plurality of data areas, said storage means being capable of storing a communication data in any one of the plurality of data areas;

first data transfer means for storing a communication data received or to be transmitted in any one of the plurality of data areas not being used;

multilayered processing means for performing a multilayered processing of the communication data in the plurality of data areas, said multilayered processing including a plurality of layer specified processing forming a hierarchical structure, said multilayered processing means including a plurality of layer specified processing means each associated with one of said plurality of layer specified processing, each of said plurality of layer specified processing means being operative to perform its own layer specified processing of the communication data while using at least one of the plurality of data areas in which the communication data to be processed has been stored; and new data area list delivery means for transferring data area pointers specifying a memory space of said storage means occupied by at least one of the plurality of data areas to be managed by said data area list or said vacant area list to a data area list when the first data transfer means stores the communication data in any one of said plurality of data areas, said vacant area list being a source and storing the data area pointers to at least one of the plurality of data areas not being used by any one of said plurality of layer specified processing means, said data area list being a destination and storing the data area pointers to at least one of the plurality of data areas that has stored in it the communication data to be subjected to at least one of the plurality of layer specified processing; wherein the vacant area list and data area list include:

a plurality of list areas, on the storage means corresponding to any one of the plurality of data areas, for storing: (1) a self-list pointer for specifying itself, (2) at least one adjacent list pointer for specifying another one of the plurality of list areas to be managed, and (3) said data area pointer, wherein said plurality of list areas are sequentially chained into an annulus through the at least one adjacent list pointer of the plurality of list areas; and list management areas, on the storage means, for storing a list chain pointer for specifying at least one of the plurality of data areas to be managed by said vacant area list and data area list, respectively, and a list depth pointer for indicating the number of at least one of the plurality of data areas to be managed by said vacant area list and data area list, respectively.

6. The communication data processor according to claim 5, wherein on delivery of data area management information and in connection with the source, said list delivery means is operative to delete at least one of the plurality of list areas, which corresponds to at least one of the plurality of data areas relating to the data area management information to be delivered, from the chain of list areas in the source, by:

(i) replacing a contents of the at least one adjacent list pointer in one of the two list areas chained directly with each list area to be delivered that corresponds to data areas that relate to the data area management information to be delivered, with a value for specifying the self-list pointer of the other one of the two list areas;

(ii) decrement the list depth pointer by one; and (iii) replacing a contents of a list chain pointer with a value for specifying the other one of the two list areas, when the self-list pointer of the list area corresponding to the data area that relates to the data area management information to be delivered, is said list chain pointer.

7. The communication data processor according to claim 5, wherein upon delivery of the data area management information and in connection with the destination, said list delivery means is operative to add at least one of list areas corresponding to at least one of the data areas that relates to the data area management information to be received to the chain of list areas in the destination by:

(i) replacing the at least one adjacent list pointer in at least one of the list areas corresponding to at least one of the data areas that relate to the data area management information to be received with a value for specifying at least one of list areas specified by its list chain pointer;

(ii) incrementing the list depth pointer by one; and (iii) replacing the contents of the list chain pointer with a value for specifying at least one of the list areas corresponding to at least one of the data areas that relate to the data area management information to be received.

8. A communication data processor comprising:

storage means having a plurality of data areas, said storage means being capable of storing a communication data in any one of the plurality of data areas;

second data transfer means for reading the communication data subjected to a multilayered processing from the plurality of data areas in which said communication data is stored, said multilayered processing including a plurality of layer specified processing forming an hierarchical structure;

multilayered processing means for performing a multilayered processing of the communication data in the plurality of data areas, said multilayered processing means including a plurality of layer specified processing means, each associated with one of the plurality of layer specified processing, each of said plurality of layer specified processing means being operative to perform its own layer specified processing of the communication data while using at least one of the plurality of data areas in which the communication data to be processed has been stored; and a vacant area list delivery means for transferring data area pointers specifying a memory space of said storage means occupied by at least one of the plurality of data areas to be managed by said vacant area list and said data area list, respectively, from a data area list to a vacant area list when the second data transfer means reads a communication data from any one of said plurality of data areas, said vacant area list being a source and storing the data area pointers to at least one of the plurality of data areas not being used by any one of said plurality of layer specified processing means, said data area list being a destination and storing the data area pointers to at least one of the plurality of data areas which has stored in it a communication data having been subjected to any one of the plurality of layer specified processing and to be subjected to at least one of the plurality of the layer specified processing; wherein the vacant area list and data area list include:

a plurality of list areas, on the storage means corresponding to any one of the plurality of data areas, for storing: (1) a self-list pointer for specifying itself, (2) at least one adjacent list pointer for specifying another one of the plurality of list areas to be managed, and (3) said data area pointer, said plurality of list areas being sequentially chained into an annulus through the at least one adjacent list pointer of the plurality of list areas; and list management areas, on the storage means, for storing: (1) a list chain pointer for specifying at least one of the plurality of data areas to be managed by said vacant area list and data area list, respectively, and (2) a list depth pointer for indicating the number of at least one of the plurality of data areas to be managed by said vacant area list data area list, respectively.

9. The communication data processor according to claim 8, wherein upon delivery of data area management information and in connection with the source, the list delivery means is operative to delete at least one of the plurality of list areas corresponding to at least one of the plurality of data areas relating to the data area management information to be delivered from the chain of list areas in the sources by:

(i) replacing a contents of the at least one adjacent list pointer in one of two list areas chained directly with each of the list areas to be delivered corresponding to data areas that relate to the data area management information to be delivered, with a value for specifying the self-list pointer of the other one of the two list areas;

(ii) decrementing the list depth pointer by one; and (iii) replacing a contents of a list chain pointer with a value for specifying the other one of the two list areas, when the self-list pointer of the list area corresponding to the data area that relates to the data area management information to be delivered is said list chain pointer.

10. The communication data processor according to claim 8, wherein upon delivery of the data area management information and in connection with the destination, the list delivery means is operative to add at least one of list areas corresponding to at least one of the data areas relating to the data area management information to be received to the chain of list areas in the destination by:

(i) replacing a contents of the at least one adjacent list pointer in at least one of the list areas corresponding to at least one of the data areas that relate to the data area management information to be received with a value for specifying at least one of the list areas specified by its list chain pointer;

(ii) incrementing the list depth pointer by one; and (iii) replacing the contents of the list chain pointer with a value for specifying at least one of the list areas corresponding to at least one of the data areas that relate to the data area management information to be received.

\* \* \* \* \*

UNITED STATES PATENT AND TRADEMARK OFFICE
CERTIFICATE OF CORRECTION

PATENT NO. : 5,774,657
DATED : June 30, 1998
INVENTOR(S) : Naoki OKAMURA et al.

It is certified that error appears in the above-identified patent and that said Letters Patent is hereby corrected as shown below:

| Column | Line | |
|---|---|---|
| 1 | 38 | Change "send" to --sent-- |
| 2 | 16 | Change "preforms" to --performs--. |
| 2 | 28 | Change "forms" to --form--. |
| 9 | 35 | Change "area" to --areas--. |
| 11 | 26 | Change "set" to --sets--. |
| 11 | 27 | Change "nest" to --next--. |
| 11 | 61 | Change "to data" to --of data--. |
| 12 | 32 | Change "shows" to --show--. |
| 13 | 21 | Change "tens bytes" to --tens of bytes--. |

UNITED STATES PATENT AND TRADEMARK OFFICE
CERTIFICATE OF CORRECTION

PATENT NO. : 5,774,657

DATED : June 30, 1998

INVENTOR(S) : Naoki OKAMURA et al.

It is certified that error appears in the above-identified patent and that said Letters Patent is hereby corrected as shown below:

| Column | Line | |
|--------|------|---|
| 13 | 31 | Change "who skilled" to --skilled in the art--. |
| 14 | 22 | After "plurality of" delete "a". |

Signed and Sealed this

Twenty-third Day of March, 1999

Attest:

Attesting Officer

Q. TODD DICKINSON

Acting Commissioner of Patents and Trademarks